United States Patent
Padiyath et al.

(10) Patent No.: US 10,088,610 B2
(45) Date of Patent: *Oct. 2, 2018

(54) LIGHT REDIRECTING CONSTRUCTIONS

(75) Inventors: Raghunath Padiyath, Woodbury, MN (US); Charles A. Marttila, Shoreview, MN (US); Mark K. Nestegard, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 625 days.

This patent is subject to a terminal disclaimer.

(21) Appl. No.: 13/514,446

(22) PCT Filed: Dec. 7, 2010

(86) PCT No.: PCT/US2010/059174
§ 371 (c)(1),
(2), (4) Date: Oct. 30, 2012

(87) PCT Pub. No.: WO2011/084303
PCT Pub. Date: Jul. 14, 2011

(65) Prior Publication Data
US 2013/0038928 A1 Feb. 14, 2013

Related U.S. Application Data

(60) Provisional application No. 61/287,360, filed on Dec. 17, 2009.

(51) Int. Cl.
*G02B 5/04* (2006.01)
*G02B 27/00* (2006.01)
*E06B 9/24* (2006.01)

(52) U.S. Cl.
CPC ............ *G02B 5/045* (2013.01); *E06B 9/24* (2013.01); *G02B 27/00* (2013.01); *E06B 2009/2417* (2013.01)

(58) Field of Classification Search
CPC . G02B 1/045; G02B 5/00; G02B 5/02; G02B 5/0221; G02B 5/0231; G02B 5/04;
(Continued)

(56) References Cited

U.S. PATENT DOCUMENTS 586,220 A * 7/1897 Basquin .................. F21S 11/00
359/595
721,256 A * 2/1903 Wadsworth ............. F21S 11/00
359/595
(Continued)

FOREIGN PATENT DOCUMENTS

CA    2598729     2/2009
EP    0753121     1/1997
(Continued)

OTHER PUBLICATIONS

English translation of Japanese reference No. 6-273689.

*Primary Examiner* — Thong Nguyen
(74) *Attorney, Agent, or Firm* — Jeffrey M. Olofson

(57) ABSTRACT

Light management constructions contain an optical substrate having a first major surface and a second major surface opposite the first major surface. The first major surface is a microstructured surface with asymmetrical structures. The asymmetrical structures form an ordered arrangement of a plurality of multi-sided refractive prisms, with the multi-sided refractive prisms having a cross section of 4 or greater sides. The light management constructions can be incorporated into optical articles such as windows.

16 Claims, 3 Drawing Sheets

(58) Field of Classification Search
CPC ......... G02B 5/045; F21S 11/00; F21S 11/002;
F21S 11/007; E06B 9/24; E06B 9/386
See application file for complete search history.

(56) References Cited

U.S. PATENT DOCUMENTS

| | | | |
|---|---|---|---|
| 732,474 A * | 6/1903 | Wadsworth | ............... F21S 11/00 |
| | | | 359/595 |
| 3,841,890 A | 10/1974 | Coaker | |
| 4,144,217 A | 3/1979 | Snelgrove | |
| 4,557,565 A | 12/1985 | Ruck | |
| 4,693,935 A | 9/1987 | Mazurek | |
| 4,773,733 A * | 9/1988 | Murphy, Jr. | ............ E06B 9/386 |
| | | | 160/176.1 R |
| 4,989,952 A | 2/1991 | Edmonds | |
| 5,223,465 A | 6/1993 | Ueki | |
| RE34,605 E | 5/1994 | Schrenk | |
| 5,360,659 A | 11/1994 | Arends | |
| 5,579,162 A | 11/1996 | Bjornard | |
| 5,882,774 A | 3/1999 | Jonza | |
| 6,049,419 A | 4/2000 | Wheatley | |
| 6,322,236 B1 | 11/2001 | Campbell | |
| 6,451,414 B1 | 9/2002 | Wheatley | |
| 6,456,437 B1 | 9/2002 | Lea | |
| 6,611,303 B1 * | 8/2003 | Lee | ..................... G02B 6/0036 |
| | | | 349/64 |
| 6,616,285 B2 | 9/2003 | Milner | |
| 6,887,917 B2 | 5/2005 | Yang | |
| 7,153,017 B2 * | 12/2006 | Yamashita | ............. G02B 5/045 |
| | | | 362/330 |
| 7,297,400 B2 | 11/2007 | Yang | |
| 7,633,679 B2 | 12/2009 | Mi | |
| 2005/0094295 A1 | 5/2005 | Yamashita | |
| 2006/0154049 A1 | 6/2006 | Padiyath | |
| 2007/0132915 A1 | 6/2007 | Mi | |
| 2007/0222916 A1 | 9/2007 | Kohara | |
| 2008/0043490 A1 | 2/2008 | Coleman | |
| 2008/0081132 A1 | 4/2008 | Bourdelais | |
| 2008/0232135 A1 | 9/2008 | Kinder | |
| 2008/0291541 A1 | 11/2008 | Padiyath | |
| 2009/0009870 A1 * | 1/2009 | Usami | ....................... E06B 9/24 |
| | | | 359/592 |
| 2009/0091836 A1 * | 4/2009 | Mi | ....................... G02B 6/0053 |
| | | | 359/599 |
| 2009/0115943 A1 | 5/2009 | Gaides | |
| 2009/0316269 A1 | 12/2009 | Kim | |
| 2011/0043919 A1 * | 2/2011 | Ko | ............................ E06B 9/24 |
| | | | 359/592 |
| 2012/0327507 A1 * | 12/2012 | Padiyath | ................ G02B 5/045 |
| | | | 359/359 |

FOREIGN PATENT DOCUMENTS

| | | |
|---|---|---|
| GB | 189711072 | 7/1897 |
| JP | 1974-114714 | 1/1973 |
| JP | 11-344605 | 12/1999 |
| WO | WO 008147632 | 12/2008 |
| WO | WO 2011/084391 | 7/2011 |

* cited by examiner

LIGHT REDIRECTING CONSTRUCTIONS

CROSS REFERENCE TO RELATED APPLICATIONS

This application is a national stage filing under 35 U.S.C. 371 of PCT/US2010/059174, filed Dec. 7, 2010, which claims priority to U.S. Provisional Patent Application No. 61/287,360, filed Dec. 17, 2009, the disclosure of which is incorporated by reference in its/their entirety herein.

FIELD OF THE DISCLOSURE

The present disclosure relates generally to optical constructions, especially for constructions that redirect light.

BACKGROUND

A variety of approaches are used to reduce energy consumption in buildings. Among the approaches being considered and applied is the more efficient use of sunlight to provide lighting inside buildings. One technique for supplying light inside of buildings, such as in offices, etc. is the redirection of incoming sunlight. Because sunlight enters windows at a downward angle, much of this light is not useful in illuminating a room. However, if the incoming downward light rays can be redirected upward such that they strike the ceiling, the light can be more usefully employed in lighting the room.

SUMMARY

Techniques and articles for the redirecting of light, such as sunlight, in useful directions are disclosed. Light management constructions and methods of making them, as well as articles prepared from these constructions are included.

Disclosed herein are light management constructions comprising an optical substrate having a first major surface and a second major surface opposite the first major surface, wherein the first major surface comprises a microstructured surface comprising asymmetrical structures, wherein the asymmetrical structures comprise an ordered arrangement of a plurality of multi-sided refractive prisms, wherein a cross section of each of the multi-sided refractive prisms comprise 4 sides (sides A, B C and D) such that: side A of the multi-sided refractive prism is parallel to and adjacent to the first major surface of the optical substrate; side B of the multi-sided refractive prism is joined to side A and is designed to produce total internal reflection of light rays incident upon the second major surface of the optical substrate at an angle of from 15-80° above the horizontal of normal to side A; side C of the multi-sided refractive prism is joined to side A; and side D of the multi-sided refractive prism is connected to side C and side B, and is designed to substantially redirect light rays reflected from side B in a direction away from side B and towards the side C and/or D.

Also disclosed are articles comprising a first glazing substrate, a light management construction attached to the substrate, the light management construction comprising an optical film having a first major surface and a second major surface opposite the first major surface wherein the first major surface comprises a microstructured surface comprising asymmetrical structures, the asymmetrical structures comprising an ordered arrangement of a plurality of multi-sided refractive prisms, and a second glazing substrate bonded to substantially all of the structures of the first major structured surface of the optical film.

DETAILED DESCRIPTION

Figure 1:
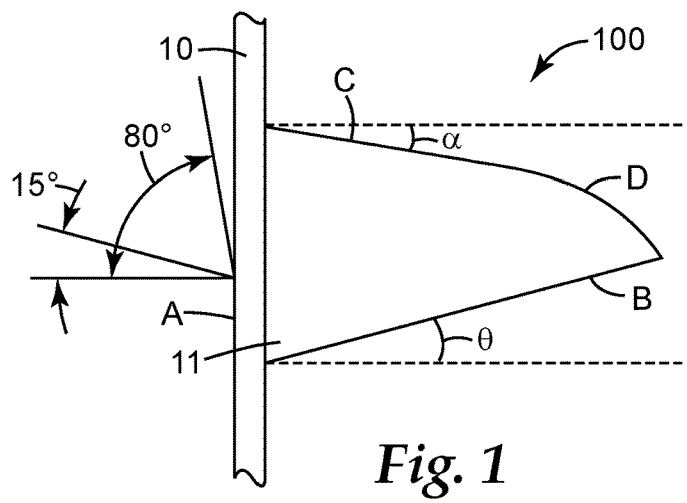
FIG. 1 shows a cross-sectional view of a light redirecting construction of this disclosure.

Windows and similar constructions are used to provide natural sunlight to rooms, corridors, and the like, in buildings. However, the angle that natural sunlight falls upon windows is such that typically the light may not penetrate far into the room or corridor. Additionally, since the incoming light may be unpleasantly strong near the window, users sitting near the window may be induced to close shutters, blinds or curtains and thus eliminate this potential source of room illumination. Therefore constructions that can redirect sunlight from the normal incident angle to a direction towards the ceiling of a room or corridor would be desirable.

Therefore, it is desirable to build windows which have the feature of redirection of sunlight built into them. The need remains for light management constructions, such as films or glass panels, that can be built into substrates, such as windows, and redirect light, especially sunlight, in useful directions, such as towards the ceiling of a room to provide illumination for the room. Since many windows comprise at least 2 layers of glazing substrates such as glass, light management films can be laminated between the glazing substrates. The use of films permits the light redirection function to be built into windows by a simple lamination step without the need to etch or otherwise permanently physically modify the window substrates. Additionally, the light management films may serve additional functions such as, for example, shatter resistance and infrared reflection. Alternatively, light management features can be built into one or more glazing substrates directly, precluding the need for the use of an additional film layer.

The light redirecting construction comprises an optical substrate comprising a first major surface and a second major surface with a microstructured surface on the first major surface. The microstructures form an ordered arrangement of a plurality of asymmetrical multi-sided refractive prisms. In some embodiments, the optical substrate comprises an optical film, in other embodiments, the optical substrate comprises a glazing substrate such as glass. Optical constructions can be prepared which comprise the light redirecting film laminated between two glazing substrates or in which the light redirecting glazing substrate is laminated with a second glazing substrate.

The term "optical substrate" as used herein refers to substrates that are at least optically transparent, may be optically clear and may also produce additional optical effects. Examples of optical substrates include optical films and glazing substrates, such as glass plates.

The term "optical film" as used herein refers to films that are at least optically transparent, may be optically clear and may also produce additional optical effects. Examples of additional optical effects include, for example, light diffusion, light polarization or reflection of certain wavelengths of light.

The term "optically transparent" as used herein refers to films or constructions that appear to be transparent to the naked human eye. The term "optically clear" as used herein refers to film or article that has a high light transmittance over at least a portion of the visible light spectrum (about 400 to about 700 nanometers), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

The term "ordered arrangement" as used herein to describe a plurality of structures, refers to a regular, repeated pattern of structures.

The terms "point", "side", and "intersection" as used herein, have their typical geometric meanings.

The term "aspect ratio" as used herein when referring to a structure attached to a substrate, refers to the ratio of the greatest height of the structure above the substrate to the base of the structure that is attached to, or part of, the substrate.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The optical substrate may be an optical film or a glazing substrate. Examples of glazing substrates include, for example, glass plates, polyolefin plates, polyimide plates, polycarbonate plates and polyacrylate plates. The description below related to the use of optical films also applies to the use of glazing substrates.

In some embodiments, the optical substrate is an optical film. The optical film may be any suitable film that has high optical transparency in the visible light region of the spectrum. The optical film may be a single layer film or a multilayer film construction. The optical film has a first major surface and a second major surface. The first major surface comprises a microstructured surface. This microstructured surface comprises an ordered arrangement of a plurality of asymmetrical multi-sided refractive prisms. It is desirable that the prisms be asymmetrical such that incoming incident solar light (which comes from above and is incident upon the film at an angle of from 15-80° from the direction perpendicular to the substrate) is redirected upwards towards the ceiling of the room, but incoming light from below is not redirected downwards. An artifact of symmetrical structures is that the downward directed light could be visible to the observer, which is undesirable.

The plurality of asymmetrical multi-sided refractive prisms is designed to effectively redirect incoming solar light towards the ceiling of a room which contains a window or other aperture containing the light directing film. Typically, the asymmetrical multi-sided refractive prisms comprise 3 or greater sides, more typically 4 or greater sides. The prisms may be viewed as an orderly array of protrusions arising from the surface of the optical film. Typically, the aspect ratio of these protrusions is 1 or greater, that is to say that the height of the protrusion is at least as great as the width of the protrusion at the base. In some embodiments, the height of the protrusions is at least 50 micrometers. In some embodiments, the height of the protrusions is no more than 250 micrometers. This means that the asymmetrical structures typically protrude from 50 micrometers to 250 micrometers from the first major surface of the optical substrate.

The criteria used to design multi-sided refractive prisms to effect this light redirection are illustrated, for example, in FIG. 1. FIG. 1 shows light directing construction 100 which contains optical substrate 10 and the cross section of a single prism 11. Prism 11 has 4 sides, side A which is adjacent to optical substrate 10, side B which is joined to side A, side C which is joined to side A, and side D which is joined to side B and side C.

Side B is angled in such a way that it produces total internal reflection to solar light rays incident upon the second major surface of the optical substrate. Solar light rays are incident from above the second major surface of the optical substrate and typically form an angle of from about 15-80° from perpendicular to the first major surface of the optical substrate depending upon the time of day, time of year, geographical location of the light redirecting construction, etc. The incident light rays enter the prism 11 and are reflected from side B by the phenomenon of total internal reflection. To achieve total internal reflection, it is desirable that side B not be perpendicular to side A, but be offset from perpendicular by angle θ as shown in FIG. 1. The selection of the value for angle θ will depend upon a variety of variable features including, for example, the refractive index of the composition materials used to prepared the light management film, the proposed geographic location of use for the light management film, etc but typically the value for angle θ is in the range 6-14° or even 6-12°.

Side C is joined to side A and connects side A to side D. It is desirable that side C not be perpendicular to side A, but be offset from perpendicular by angle α. The offset of angle α, among other features, aids in preventing light which exits prism 11 through side D from entering an adjacent prism (not shown in FIG. 1). As with angle θ, the selection of the value for angle α depends upon a variety of variable features, including the closeness of adjacent prisms, the nature and size of side D, etc. Typically, angle α is in the range 5-25° or even 9-25°.

Side D is the side of the prism from which the redirected light rays exit the prism. In FIG. 1 side D is shown as a single side but side D may comprise a series of sides. Also, in FIG. 1 side D is shown as a curved side, but side D need not be curved in all embodiments. Light rays that are reflected from side B are redirected by side D to a direction useful for improving the indirect lighting of a room. By this it is meant that the light rays reflected from side D are redirected either perpendicular to side A or at an angle away from perpendicular and towards the ceiling of the room.

In some embodiments, side C may be curved, side D may be curved, or the combination of sides C and D may form a single continuously curved side. In other embodiments, side C or D or C and D taken together comprises a series of sides, wherein the series of sides comprises a structured surface. The structured surface may be regular or irregular, i.e., the structures may form regular patterns or random patterns and may be uniform or the structures may be different. These structures, since they are substructures on a microstructure, are typically very small. Typically, each dimension of these structures (height, width and length) is smaller than the dimension of side A.

Figure 8:
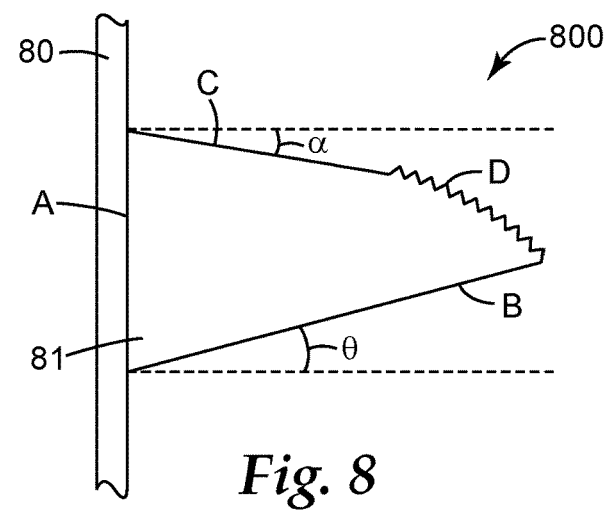
FIG. 8 is a cross sectional view of another light redirecting construction of this disclosure.

This embodiment is shown in FIG. 8. In FIG. 8, light redirecting construction 800 contains optical substrate 80 and the cross section of a single prism 81. Prism 81 has 4 sides A, B, C, and D, as in FIG. 1, wherein side D comprises a series of structures in which each dimension of the structures (height and width) is smaller than the dimension of side A. The angles $\theta$ and $\alpha$ are as defined in FIG. 1.

Figure 2:
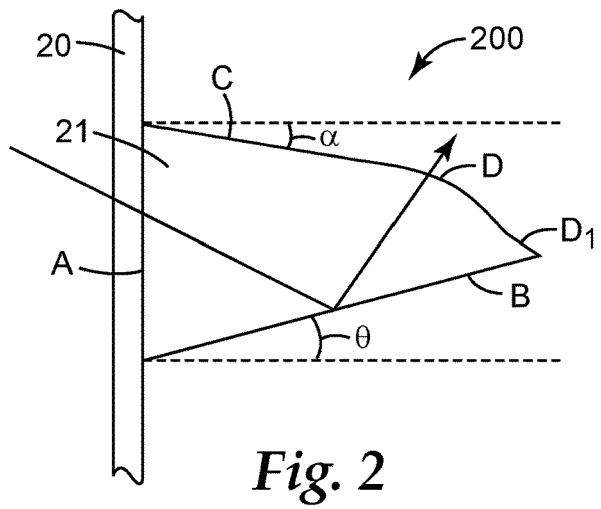
FIG. 2 shows a cross-sectional view of another light redirecting construction of this disclosure.

FIG. 2 shows another embodiment of a light directing construction. In FIG. 2, light directing construction 200 contains optical substrate 20 and the cross section of a single prism 21. Prism 21 has 4 sides, side A which is adjacent to optical substrate 20, side B which is joined to side A, side C which is joined to side A, and side D which is joined to side B and side C. Side D comprises sub-side $D_1$. Sub-side $D_1$ is joined to side B by a point. This point provides a point of contact with a glazing substrate or an optional cover film (the glazing substrate or optional cover film are not shown in FIG. 2). The angles $\theta$ and $\alpha$ are as defined in FIG. 1. FIG. 2 also shows lines designating the pathway of light entering prism 21, and being reflected by side B and exiting the prism through side D.

Figure 3:
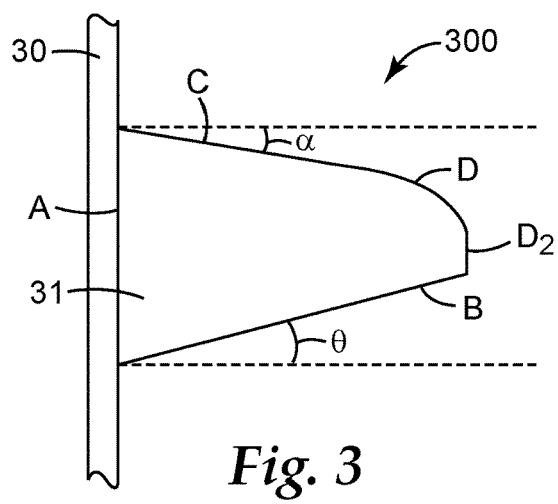
FIG. 3 shows a cross-sectional view of another light redirecting construction of this disclosure.

FIG. 3 shows another embodiment of a light directing construction. In FIG. 3, light directing construction 300 contains optical substrate 30 and the cross section of a single prism 31. Prism 31 has 4 sides, side A which is adjacent to film 30, side B which is joined to side A, side C which is joined to side A, and side D which is joined to side B and side C. Side D comprises sub-side $D_2$. Sub-side $D_2$ is joined to side B and is designed to form a bonding zone with a glazing substrate or cover film (the glazing substrate or cover film is not shown in FIG. 3). The angles $\theta$ and $\alpha$ are as defined in FIG. 1.

The entire surface of the optical substrate may contain microstructures, or the microstructures may be present on only a portion of the first surface of the optical substrate. This is particularly true in instances when optical substrate comprises a glazing substrate. Since the glazing substrate may become incorporated into a glazing article and may serve as a glazing substrate in, for example, a window, it may not be necessary or desirable for the entire surface of the glazing substrate to contain a microstructured surface in order to produce the desirable light redirection effect.

Figure 4:
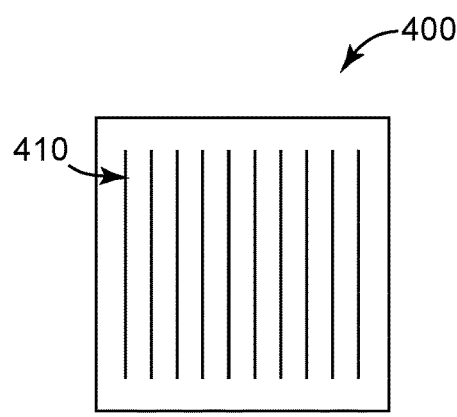
FIG. 4 shows a top view of a light redirecting construction of this disclosure.
Figure 5:
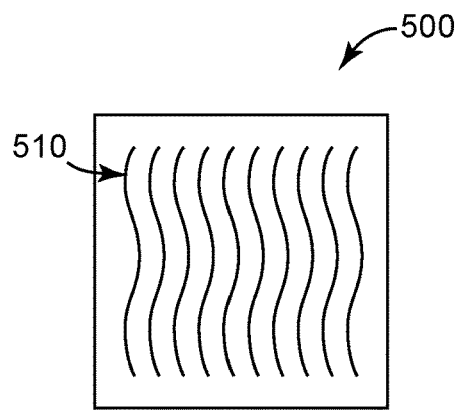
FIG. 5 shows a top view of another light redirecting construction of this disclosure.
Figure 6:
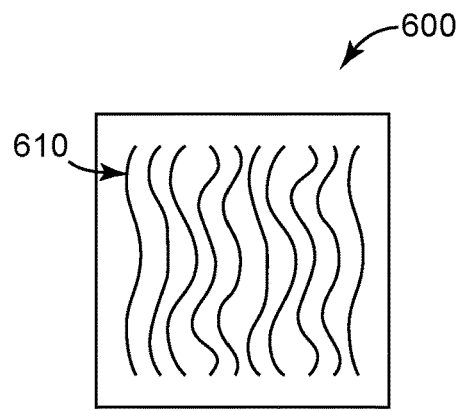
FIG. 6 shows a top view of another light redirecting construction of this disclosure.
Figure 7:
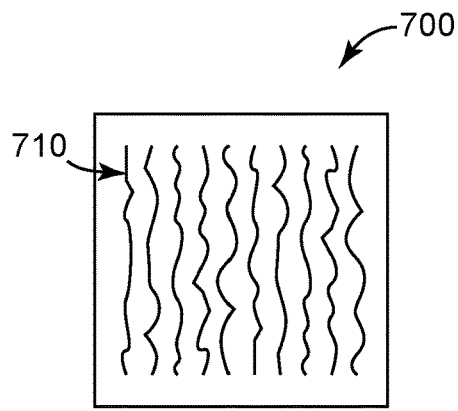
FIG. 7 shows a top view of another light redirecting construction of this disclosure.

The ordered arrangement of a plurality of asymmetrical multi-sided refractive prisms can form an array of microstructures. The array can have a variety of elements. For example, the array can be linear (i.e. a series of parallel lines), sinusoidal (i.e. a series of wavy lines), random, or combinations thereof. While a wide variety of arrays are possible, it is desirable that the array elements are discrete, i.e., that the array elements do not intersect or overlap. FIGS. 4-7 show top views of ordered arrangements of a plurality of asymmetrical multi-sided refractive prisms with a variety of array elements. In FIG. 4, light redirecting construction 400 contains linear array elements 410. In FIG. 5, light redirecting construction 500 contains sinusoidal array elements 510. In FIG. 6, light redirecting construction 600 contains sinusoidal array elements 610. In FIG. 6, the sinusoidal array elements 610 are out of phase with one another. In FIG. 7, light redirecting construction 700 contains random array elements 710. The array elements in FIGS. 4-7 are merely representational and are not drawn to scale, also, the figures are intended to be illustrative, additional array elements and combinations are possible and are within the scope of this disclosure.

Figure 9:
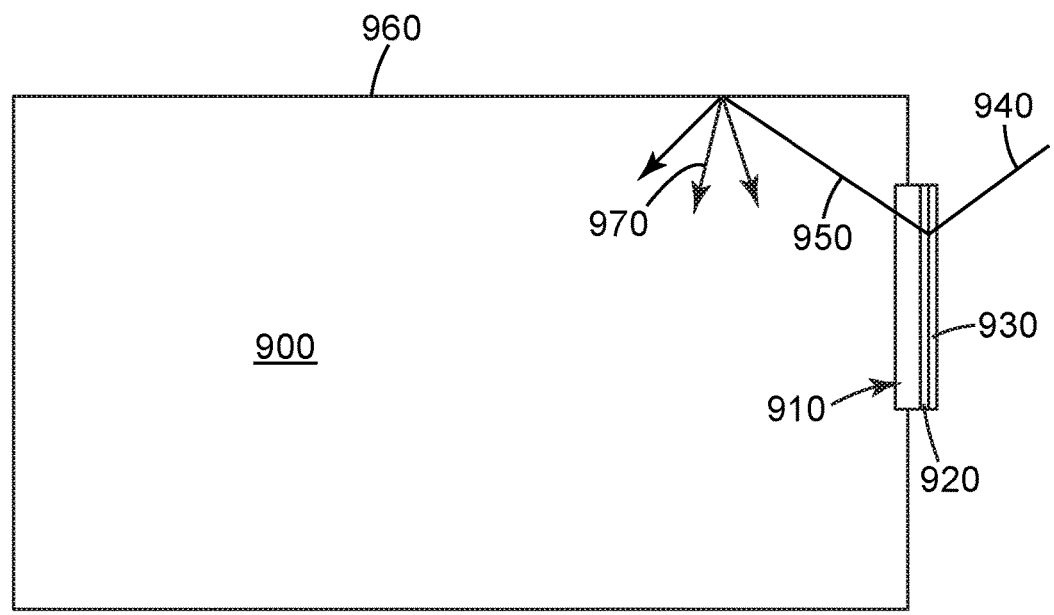
FIG. 9 is a cross sectional view of a room containing a window with a light redirecting construction of this disclosure.

FIG. 9 shows a room 900 with window 910 and ceiling 960. Window 910 has glazing substrate 920. Light redirecting film construction 930 is attached to glazing substrate 920 such that incoming solar light ray 940 is redirected upwards as ray 950 towards the ceiling 960 and dispersed as light rays 970 to provide illumination for room 900.

The second major surface of the optical film is designed to be laminated to a first glazing substrate. Typically, this surface contains a coating, such as an adhesive coating, which adheres the light redirecting film to a first glazing substrate surface. Examples of suitable adhesives include, for example, heat activated adhesives, pressure sensitive adhesives or curable adhesives. Examples of suitable optically clear curable adhesives include those described in U.S. Pat. No. 6,887,917 (Yang et al.). Depending upon the nature of the adhesive, the adhesive coating may have a release liner attached to it to protect the adhesive coating from premature adhesion to surfaces and from dirt and other debris which can adhere to the adhesive surface. The release liner typically remains in place until the light redirecting laminate is to be attached to the substrate. Typically, a pressure sensitive adhesive is used.

A wide variety of pressure sensitive adhesive compositions are suitable. In some embodiments, the pressure sensitive adhesive is optically clear. The pressure sensitive adhesive component can be any material that has pressure sensitive adhesive properties. Additionally, the pressure sensitive adhesive component can be a single pressure sensitive adhesive or the pressure sensitive adhesive can be a combination of two or more pressure sensitive adhesives.

Suitable pressure sensitive adhesives include, for example, those based on natural rubbers, synthetic rubbers, styrene block copolymers, polyvinyl ethers, poly(meth)acrylates (including both acrylates and methacrylates), polyolefins, silicones, or polyvinyl butyral.

The optically clear pressure sensitive adhesives may be (meth)acrylate-based pressure sensitive adhesives. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methylbutyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In certain embodiments, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

The adhesive layer may be crosslinked. The adhesives can be crosslinked by heat, moisture or radiation, forming covalently crosslinked networks which modify the adhesive's flowing capabilities. Crosslinking agents can be added to all types of adhesive formulations but, depending on the coating and processing conditions, curing can be activated by thermal or radiation energy, or by moisture. In cases in which crosslinker addition is undesirable one can crosslink the adhesive if desired by exposure to an electron beam.

The degree of crosslinking can be controlled to meet specific performance requirements. The adhesive can optionally further comprise one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, and mixtures thereof can be used.

In addition to being optically clear, the pressure sensitive adhesive may have additional features that make it suitable for lamination to large substrates such as windows. Among these additional features is temporary removability. Temporarily removable adhesives are those with relatively low initial adhesion, permitting temporary removability from, and repositionability on, a substrate, with a building of adhesion over time to form a sufficiently strong bond. Examples of temporarily removable adhesives are described, for example in U.S. Pat. No. 4,693,935 (Mazurek). Alternatively, or in addition, to being temporarily removable, the pressure sensitive adhesive layer may contain a microstructured surface. This microstructured surface permits air egress as the adhesive is laminated to a substrate. For optical applications, typically, the adhesive will wet out the surface of the substrate and flow to a sufficient extent that the microstructures disappear over time and therefore do not affect the optical properties of the adhesive layer. A microstructured adhesive surface may be obtained by contacting the adhesive surface to a microstructuring tool, such as a release liner with a microstructured surface.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive. In some embodiments, the pressure sensitive adhesive may contain a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

The pressure sensitive adhesive of the present disclosure exhibits desirable optical properties, such as, for example, controlled luminous transmission and haze. In some embodiments, substrates coated with the pressure sensitive adhesive may have substantially the same luminous transmission as the substrate alone.

Besides being the carrier and support layer for the microstructured surface, the optical film can also provide additional functionality to the light redirecting film. For example, the optical film can be a multilayer film that can reflect infrared light. In this way the light redirecting laminate can also help to keep the undesirable infrared light (heat) out of the building while allowing the desirable visible light into the building. Examples of suitable multilayer films useful as the optical film include those disclosed, for example, in U.S. Pat. Nos. 6,049,419, 5,223,465, 5,882,774, 6,049,419, RE 34,605, 5,579,162 and 5,360,659. In some embodiments, the optical film is a multilayer film in which the alternating polymeric layers cooperate to reflect infrared light. In some embodiments, at least one of the polymeric layers is a birefringent polymer layer.

The optical film may have additional coatings on the second major surface in addition to or instead of the adhesive coating already described. For example, the second major surface may contain an anti-glare coating.

Additionally, the optical film may be designed to provide additional advantageous structural features to glazing laminates besides the above-described optical features. The presence of a film laminated between 2 glazing substrates typically improves the strength and shatter resistance of the glazing laminates. Such properties can be enhanced by, for example, including shatter resistant or tear resistant features to the optical film. Such features can be provided by selection of materials that have such features or using films of an appropriate thickness to give such features if the optical film is a single film layer or by incorporating films which have such features if the optical film is a multilayer film.

Typically, the optical film or multilayer optical film, is prepared from polymeric materials that permit the film to be optically clear. Examples of suitable polymeric materials include, for example, polyolefins such as polyethylene and polypropylene, polyvinyl chloride, polyesters such as polyethylene terephthalate, polyamides, polyurethanes, cellulose acetate, ethyl cellulose, polyacrylates, polycarbonates, silicones, and combinations and blends thereof. The optical film may contain other components besides the polymeric material, such as fillers, stabilizers, antioxidants, plasticizers and the like. In some embodiments, the optical film may comprise a stabilizer such as a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

In embodiments where the optical substrate comprises a glazing substrate, the second major surface of the glazing substrate typically will not contain an adhesive layer but may contain coatings or film layers such as those described above.

The microstructure layer on the first major surface of the optical substrate may be formed in a variety of ways. Typically, the microstructure layer comprises a thermoplastic or a thermoset material.

The microstructured constructions described above are manufactured using various methods, including embossing, extrusion, casting and curing, compression molding and injection molding. One method of embossing, suitable for forming microstructured films, is described in U.S. Pat. No. 6,322,236, which includes diamond turning techniques to form a patterned roll which is then used for embossing a microstructured surface onto a film. A similar method may be used to form the constructions described above having an ordered arrangement of a plurality of asymmetrical structures.

Other approaches may be followed for producing a film having a microstructured surface with a repeating pattern. For example, the film may be injection molded using a mold having a particular pattern thereon. The resulting injection molded film has a surface that is the complement of the pattern in the mold. In another and similar approach, the film may be compression molded.

In some embodiments, the microstructured constructions are prepared using an approach called casting and curing. In casting and curing, a curable mixture is coated onto a surface to which a microstructuring tool is applied or the mixture is coated into a microstructuring tool and the coated microstructuring tool is contacted to a surface. The curable mixture is then cured and the tooling is removed to provide a microstructured surface. Examples of suitable microstructuring tools include microstructured molds and microstructured liners. Examples of suitable curable mixtures include thermoset materials such as the curable materials used to prepare polyurethanes, polyepoxides, polyacrylates, silicones, and the like. The cast and cure method can be used to provide a microstructured surface on either an optical film substrate or a glazing substrate.

The light management constructions of this disclosure are designed to redirect incoming sunlight to make the sunlight more useful for room lighting. The constructions redirect the generally downward angled light from the sun towards the ceiling of a room to aid in the overall illumination of the room. Measurements of the ability of the constructions to redirect light can be determined by laboratory testing, precluding the need to test the constructions by installing them into windows for testing. An example of such a test involves the shining of a beam of light with a controlled intensity onto the construction and measuring the amount of light that is redirected upwards. The input beam of light may be set at a given angle or may be varied over a range of angles. The amount of light redirected upwards can be measured, for example, with a photodetector. It may be desirable to measure the distribution of light at all directions. This type of measurement is commonly referred to as bi-directional transmission distribution function (BTDF). An instrument available from Radiant Imaging, WA, under trade name IMAGING SPHERE may be used to perform such measurements.

The light management constructions of this disclosure may be attached to glazing substrates to provide articles, such as glazing articles with light directing properties. Generally the light management construction is a film it is laminated between two glazing substrates. The glazing substrates comprise an inner surface and an outer surface. The light management film is laminated between the two inner surfaces of the glazing substrates. The glazing substrates are at least optically transparent, and may be optically clear. Examples or suitable glazing substrates may be prepared from a variety of different materials including, for example, a variety of different types of glass or from polymeric materials such as polyolefins, polyimides, polycarbonates or polymethyl methacrylates. In some embodiments, the glazing substrate may also comprise additional layers or treatments. Examples of additional layers include, for example, additional layers of film designed to provide glare reduction, tinting, shatter resistance and the like. Examples of additional treatments that may be present on glazing substrates include, for example, coatings or various types such as hardcoats, and etchings such as decorative etchings.

In embodiments where the light management construction comprises a microstructured surface on a glazing substrate, the microstructured glazing substrate may be incorporated into a multilayer glazing article. Such articles may be prepared by lamination of one or more additional glazing substrates to the microstructured glazing substrate. Typically, at least the microstructured surface of the microstructured glazing substrate is laminated to an additional glazing substrate, but additional glazing substrates and/or additional layers such as film layers or coatings may be included in the glazing article.

Regardless of the substrate on which the microstructured surface is present in the light management construction, in order to provide the desired light redirection effect, the ordered arrangement of a plurality of asymmetrical multi-sided refractive prisms should be oriented within a glazing article such that the asymmetric side of the microstructures are facing towards the top of the installed glazing article. In this way, incoming sunlight will be directed towards the ceiling of the room that contains the glazing article. If the ordered arrangement of a plurality of asymmetrical multi-sided refractive prisms was oriented within a glazing substrate such that the asymmetric side of the microstructures is oriented towards the bottom of the installed glazing article, the incoming sunlight would be directed towards the floor of the room that contains the glazing article.

In some embodiments, the light management films contain an adhesive layer on the second surface of the optical film to laminate the film to a first glazing substrate. The adhesive layer may be protected by a release liner. As mentioned above, the release liner may contain a microstructured surface to impart microstructuring to the adhesive surface and permit air egress as the light management film is laminated to the substrate. This air egress aids in the elimination of air bubbles in the lamination.

As mentioned above, the adhesive may also be removable, meaning adhesives with relatively low initial adhesion, permitting temporary removability from and repositionability on a substrate, with a building of adhesion over time to form a sufficiently strong bond. This can particularly useful when large areas of a substrate are to be laminated.

Historically, the lamination of an article, such as light management film, to a large surface substrate has been accomplished by what is sometimes called a "wet" application process. The wet application process involves spraying a liquid, typically a water/surfactant solution, onto the adhesive side of the large format article, and optionally onto the substrate surface. The liquid temporarily "detackifies" the pressure sensitive adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

While the wet application process has been used successfully in many instances, it is a time consuming and messy process. A "dry" application process is generally desirable for installing large format graphic articles. Adhesives that are self wetting and removable may be applied with a dry installation process. The articles are easily attached to a large substrate because they are self wetting and yet they may be easily removed and repositioned as needed.

In other embodiments, an adhesive layer may be applied to the inner surface of the first glazing substrate. The adhesive layer on the first glazing substrate may be selected from the adhesives described above. The adhesive layer may be protected by a release liner or the adhesive layer may be applied to the first glazing substrate prior to lamination of the light management film.

The second glazing substrate may be the same as or different from the first glazing substrate. The inner surface of the second glazing substrate is in contact with the microstructured surface of the light management film. Typically, the inner surface of the second glazing substrate is in contact with at least a portion of essentially all of the microstructures of the microstructured surface of the light management film.

The second glazing substrate is adhered to the microstructured surface of the light management film. Typically, an adhesive layer is used to adhere the second glazing substrate to the microstructured surface of the light management film. The adhesive may be applied to the microstructured surface of the light management film, but more typically it is applied to the inner surface of the second glazing substrate. The adhesive layer on the second glazing substrate may be selected from the adhesives described above, and may be the same as or different from, the adhesive used to adhere the light management film to the first glazing substrate.

Typically, the glazing articles are installed within a frame. The frame may be constructed of any conventional frame materials such as wood, synthetic plastics, composites or metals, such as aluminum. The glazing articles may be held within the frame by gaskets, sealants, adhesives or the like. The frames additionally may be painted with acrylic, latex or oil-based paints or may contain other coatings such as urethanes, epoxies or lacquers.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Example 1

A master tool having the negative of the desired linear grooves and prismatic elements (with a cross section similar to FIG. 3) was obtained using a diamond turning process. A UV curable resin composition was prepared by blending 74 parts by weight of an aliphatic urethane acrylate oligomer, commercially available under the trade designation "PHOTOMER 6010" from Cognis, Monheim, Germany, 25 parts 1,6-hexanediol diacrylate, commercially available under the trade designation "SARTOMER SR 238" from Sartomer, Exton, Pa., and an alpha-hydroxy ketone UV photoinitiator (2-hydroxy-2-methyl-1-phenyl-1-propanone), commercially available under the trade designation "DAROCUR 1173" from Ciba, Basel, Switzerland. A 76 micrometer (3 mil) thick PET (polyethylene terephthalate) film, commercially available from DuPont Teijin Films, Hopewell, Va. under the trade designation "MELINEX 453", was coated with the UV curable resin to an approximate thickness of 85 micrometers. The coated film was placed in physical communication with the master tool such that the grooves were void of any air. The resin was cured while in physical communication with the master tool with a microwave powered UV curing system available from Fusion UV systems, Gaithersburg, Md. The cured resin on the web was removed from the master tool resulting in a microstructured film. One liner of a 25 micrometer (1 mil) thick optically clear adhesive transfer tape, commercially available from 3M Company, St. Paul, Minn. under the trade designation "3M OPTICALLY CLEAR ADHESIVE 8171", was removed and the exposed adhesive surface was laminated to the non-structured side of the microstructured film in a roll-to-roll laminator available from Protech Engineering, Wilmington, Del.

Example 2

A light redirecting construction similar to that prepared in Example 1 can be prepared on a glass substrate. A similar master tool obtained using a diamond turning process could be used. A similar UV curable resin composition containing 74 parts by weight of an aliphatic urethane acrylate oligomer, commercially available under the trade designation "PHOTOMER 6010" from Cognis, Monheim, Germany, 25 parts 1,6-hexanediol diacrylate, commercially available under the trade designation "SARTOMER SR 238" from Sartomer, Exton, Pa., and an alpha-hydroxy ketone UV photoinitiator (2-hydroxy-2-methyl-1-phenyl-1-propanone), commercially available under the trade designation "DAROCUR 1173" from Ciba, Basel, Switzerland could be prepared. A glass plate could be coated with the UV curable resin to an approximate thickness of 85 micrometers. The coated film could be placed in physical communication with the master tool such that the grooves are void of any air. The resin could be cured while in physical communication with the master tool with a microwave powered UV curing system available from Fusion UV systems, Gaithersburg, Md. The cured resin on the web could be removed from the master tool resulting in a microstructured film.

What is claimed is:

1. A light management construction comprising:
a room with a ceiling and at least one window, wherein the window comprises at least one glazing substrate; and
a light redirecting construction attached to the glazing substrate of the window, wherein the light redirecting construction comprises:
an optical substrate having a first major surface and a second major surface opposite the first major surface, wherein the first major surface comprises a microstructured surface comprising asymmetrical structures each structure protruding 50-250 micrometers from the first major surface, wherein the asymmetrical structures comprise an ordered arrangement of a plurality of multi-sided refractive prisms, wherein a cross section of each of the multi-sided refractive prisms comprises at least 4 sides (sides A, B, C, and D) such that: side A of each of the multi-sided refractive prisms is parallel to and adjacent to the first major surface of the optical substrate; side B of each of the multi-sided refractive prisms is joined to side A and is angled to produce total internal reflection of light rays incident upon the second major surface of the optical substrate at an angle of from 15-80° from perpendicular to the first major surface; side C of each of the multi-sided refractive prisms is joined to side A; and side D of each of the multi-sided refractive prisms is connected to side C and side B, and side C is not perpendicular to side A to substantially redirect light rays reflected from side B in a direction away from side B and towards the side D, such that the light redirecting construction attached to the glazing substrate of the window redirects light rays of incoming solar light incident on the second major surface of the optical substrate upwards towards the ceiling of the room, and light incident on the second major surface of the optical substrate from below is not redirected downwards.

2. The light management construction of claim 1, wherein side B forms an angle with side A which is less than 90° at a point of intersection.

3. The light management construction of claim 1, wherein side C forms an angle with side A of 5-25° at a point of intersection.

4. The light management construction of claim 1, wherein side D comprises a series of sides, at least one of which is curved, or side C and D together form a single curved surface.

5. The light management construction of claim 4, wherein side D comprises a side $D_1$ which is joined to side B to form a point.

6. The light management construction of claim 4, wherein side D comprises a side $D_2$ which provides a bonding surface.

7. The light management construction of claim 1, wherein side C or D or C and D taken together comprises a series of sides, wherein the series of sides comprises a structured surface, wherein each dimension of height or width of a structure on the structured surface is smaller than a dimension of side A.

8. The light management construction of claim 1, wherein the asymmetrical structures have an aspect ratio greater than 1, wherein aspect ratio refers to the ratio of a greatest height of the structure above the substrate to the base of the structures that is attached to, or part of, the substrate.

9. The light management construction of claim 1, wherein the asymmetrical structures comprise a thermoplastic or a thermoset material.

10. The light management construction of claim 1, wherein the optical substrate comprises an optical film.

11. The light management construction of claim 10, wherein the optical film comprises a multilayer optical film.

12. The light management construction of claim 11, wherein the multilayer optical film comprises a multilayer film comprising alternating polymeric layers that cooperate to reflect infrared radiation.

13. The light management construction of claim 12, wherein at least one of the polymeric layers comprises a birefringent polymer layer.

14. The light management construction of claim 1, wherein second major surface of the optical substrate comprises a coating, wherein the coating comprises an adhesive coating.

15. The light management construction of claim 1, wherein the optical substrate comprises a glazing substrate.

16. The light management construction of claim 1, further comprising a second glazing substrate bonded to substantially all of the structures of the first major structured surface of the optical substrate.

* * * * *